United States Patent [19]

Bruckner et al.

[11] Patent Number: 4,727,930

[45] Date of Patent: Mar. 1, 1988

[54] HEAT TRANSFER AND STORAGE SYSTEM

[75] Inventors: Adam P. Bruckner, Seattle; Abraham Hertzberg, Bellevue; David J. Shaw, Seattle, all of Wash.

[73] Assignee: The Board of Regents of the University of Washington, Seattle, Wash.

[21] Appl. No.: 293,196

[22] Filed: Aug. 17, 1981

[51] Int. Cl.[4] .......................... F28C 3/14; F28D 19/02
[52] U.S. Cl. .................................... 165/1; 165/104.17; 165/111; 165/84
[58] Field of Search ...................... 165/111, 104.17, 1, 165/84

[56] References Cited

U.S. PATENT DOCUMENTS 3,185,457  5/1965  Boll et al. .................. 165/104.17 X

OTHER PUBLICATIONS

Nichols, M. C. et al., Direct Contact Heat Exchange for Latent Heat-of-Fusion Energy Storage Systems, Proceedings of Miami International Conference on Alternative Energy Sources, Miami Beach Fla., pp. 3939–3958, 1978.
Fouda, A. E. et al., Solar Storage Systems Using Salt Hydrate Latent Heat and Direct Contact Heat Exchange-1, Solar Energy, vol. 25, pp. 437–444, 1980.

Primary Examiner—Albert W. Davis, Jr.
Attorney, Agent, or Firm—Christensen, O'Connor, Johnson & Kindness

[57] ABSTRACT

An energy storage and conversion system utilizes unique heat exchange media for storing and transferring heat. In one embodiment, a refractory material is heated to the molten state by a solar furnace. The refractory material is stored in its molten form and metered to a direct-contact heat exchanger. It is fed into the heat exchanger in a plurality of streams that break into a plurality of droplets. The droplets flow through the heat exchanger in countercurrent relationship with a relatively inert gas such as argon or nitrogen. The gas is heated and expanded through an expansion engine to convert the thermal energy to mechanical energy which in turn can be utilized to produce electricity, for example. The refractory can be sufficiently cooled in the heat exchanger to fuse into beads, which can be easily recycled to the solar furnace.

7 Claims, 5 Drawing Figures

HEAT TRANSFER AND STORAGE SYSTEM

BACKGROUND OF THE INVENTION

This invention was developed in part during work conducted under and supported by NASA research grant NAG 3-16, as well as by a grant from the University of Washington Graduate School Research Fund awarded through the Washinton Energy Research Center.

Achieving effective heat transfer is one of the principal problems facing the designers of efficient energy conversion systems for almost any application today, ranging from today's coal combustion systems to advanced fusion power and solar energy extraction systems. Ideally, a heat exchanger should be operated at temperatures matching the thermodynamic potential of the peak temperatures of the system heat source. Conventional heat exchangers, however, are rarely able to match that potential, severely limiting the capability of operating at desirable temperatures. Furthermore, when operating to recover heat at lower temperatures in a heat transfer system, large pressure drops are required by small temperature differentials, leading to correspondingly higher costs of heat transfer and concomitant inefficiencies.

Another problem in achieving efficient energy conversion systems relates to the storage of energy. Energy storage is of benefit to the operation of central power stations, for example, by providing a means of matching periodically varying loads to the uniform output desirable to operate a powerplant most efficiently. For example, an efficient and economical energy storage system must be an integral part of the design of a solar powerplant because of the intermittent nature of the solar energy resource. Few presently suggested solar power systems directly integrate energy storage into the powerplant design. Often, with the prior designs, waste heat from a primary cycle is stored, and then used at low temperatures in less efficient bottoming cycles. When energy storage is provided for use in the primary cycle, such as in a liquid sodium energy storage system, heat must still be transferred through a heat exchanger. Such storage sytems, however, are expensive. Additionally, currently available heat exchanger materials severely limit working temperatures.

High-temperature heat storage facilities and heat transfer devices are essential to economically attractive central power stations such as solar energy powerplants. For example, promising power generation cycles with efficiencies ranging from 45% to 70% can be achieved at the peak temperatures of up to 2000° K. It has been suggested that capacitive heat exchangers might be employed to exploit the more efficient, higher temperature regimes because they circumvent some of the limitations of conventional tube wall heat exchangers. Capacitive heat exchangers and storage systems can use high-temperature materials and transport those materials into direct contact with a heat source. Common examples of conventional capacitive heat exchangers are packed bed regenerative heat exchangers and fluidized bed heat exchangers. However, conventional capacitive heat exchangers also suffer from serious drawbacks in that the solid phase capacitive elements, which must operate in a cyclic fashion, are subject to physical degradation resulting from thermal shock. Since the solid phase capacitive elements represent a high fraction of the total system cost of capactive heat exchangers, the replacement costs of the capacitive elements become increasingly acute as higher temperatures and larger rates of temperature change are encountered.

SUMMARY OF THE INVENTION

In accordance with the present invention, it has been found that classical inefficiencies of prior capacitive heat exchangers can be overcome by providing capacitive elements that are mobile and that are remanufactured during each temperature cycle. In this manner, degradation of solid-phase capacitive elements due to thermal shock is eliminated. Additionally, by employing liquid-phase capacitive elements, an energy storage system can become an integral part of a heat exchange system. More importantly, the energy storage system associated with such capacitive elements can be high enough to maximize the thermodynamic potential of a heat source. Moreover, the energy storage capability allows a system utilizing the present invention to be continuously operated under optimum conditions.

In its broadest sense, the present invention provides a method for exchanging heat between a first liquid heat exchange medium and a second fluid heat exchange medium by first causing a first heat exchange medium to traverse a heat transfer zone in the form of droplets, and simultaneously causing a second heat exchange medium to traverse the heat transfer zone in countercurrent flow relationship to the first heat exchange medium, while allowing the first and second heat exchange media to make intimate thermal contact with each other. In a preferred form of the invention, the second heat exchange medium comprises a gas. Preferably too, the first heat exchange medium is injected into the heat transfer zone as a liquid stream that is sized to cause the stream to break into a plurality of droplets as it is entering the heat transfer zone. The first heat transfer medium is preferably cooled from the liquid phase to the solid phase before it is removed from the heat transfer zone, thus, allowing the first heat transfer medium, that is, the capacitive elements, to be handled as a solid. Very high operating temperatures can be achieved by using a refractory oxide as the first heat transfer medium.

A direct-contact heat exchange system employing the broad method of heat transfer includes a container means defining a heat transfer chamber. A first inlet means is associated with the container means for introducing the first heat exchange medium into the chamber as a plurality of liquid droplets. A first outlet means is associated with the container means and is spaced from the first inlet means for removing the first heat exchange medium from the chamber. A second inlet means is associated with the container means and is spaced from the first inlet means in the direction of the first outlet means. The second inlet means introduces th second fluid heat exchange medium into the chamber. A second outlet means is associated with the container means and is spaced from the second inlet means in the direction of the first inlet means. The second outlet means removes the second heat exchange medium from the chamber. Of course, the first and second heat exchange media must be immiscible with each other. Additionally, the inlet and the outlet means must be constructed and arranged relative to the chamber so that the heat exchange media will be placed in intimate thermal contact as they flow in countercurrent relationship past each other between their respective inlet and outlet means.

The heat exchange system provided by the present invention can be employed in an energy storage and conversion system. Such a system comprises first a means for heating the first heat exchange medium in an elevated temperature at which it is a liquid. An engine means is provided for receiving the second heat exchange medium at an elevated temperature and extracting energy therefrom. The heat exchange means comprises the heat transfer chamber for transferring the heat from the first heat exchange medium to the second heat exchange medium. The heat exchange means includes means for causing the first heat exchange medium to traverse the heat transfer chamber in the form of a plurality of droplets. The heat exchange means further includes means for causing the second heat exchange medium to traverse the chamber in countercurrent flow relative to the first heat exchange medium, thereby allowing the first and second heat exchange media to make intimate thermal contact with each other. A means is provided for transferring the first heat exchange medium from the means for heating to the heat exchange means. A means is also provided for transferring the second heat exchange medium from the heat exchange means to the engine means. Importantly, a storage means for storing the first heat exchange medium at an elevated temperature can be interposed between the means for heating the first heat exchange medium and the heat exchange means. In this environment, the means for transferring the first heat exchange medium includes means for transferring that medium to and from the storage means.

In a preferred embodiment of the energy storage and conversion system, the first and second heat exchange media respectively comprise a refractory oxide and a relatively inert gas. An extremely inexpensive refractory oxide, such as silica, can readily be employed with a gaseous second heat transfer medium such as argon or nitrogen. Silica, for example, is on an order of magnitude less expensive than conventional, competitive energy storage materials. A solar furnace can be utilized to melt the refractory oxide. The oxide can be stored in a suitable container from whence it can be continuously dispensed to a capacitive heat transfer system constructed in accordance with the present invention. The gas is heated and can be expanded, for example, through an expansion engine to convert the heat contained in the gaseous second heat transfer medium to mechanical work.

BRIEF DESCRIPTION OF THE DRAWINGS

A better understanding of the present invention can be derived by reading the ensuing specification in conjunction with the accompanying drawings wherein.

DETAILED DESCRIPTION OF THE INVENTION

The heat exchange, energy storage and energy conversion system of the present invention is first broadly described and explained in conjunction with a solid power system. It is to be understood, however, that a solar-powered energy conversion system is only one of many possible applications of the heat exchange and energy storage system in accordance with the present invention. The energy conversion system will first be broadly described followed by a more detailed explanation of each of its major components and subsystems. For purposes of this explanation two heat exchange media are employed; a first, to be referred to as the "droplet medium", is chosen as a refractory oxide, such as silica. The refractory oxide is alternately transformed from the solid phase to the liquid phase. The second heat exchange medium is a relatively inert gas such as argon or nitrogen.

Figure 1:
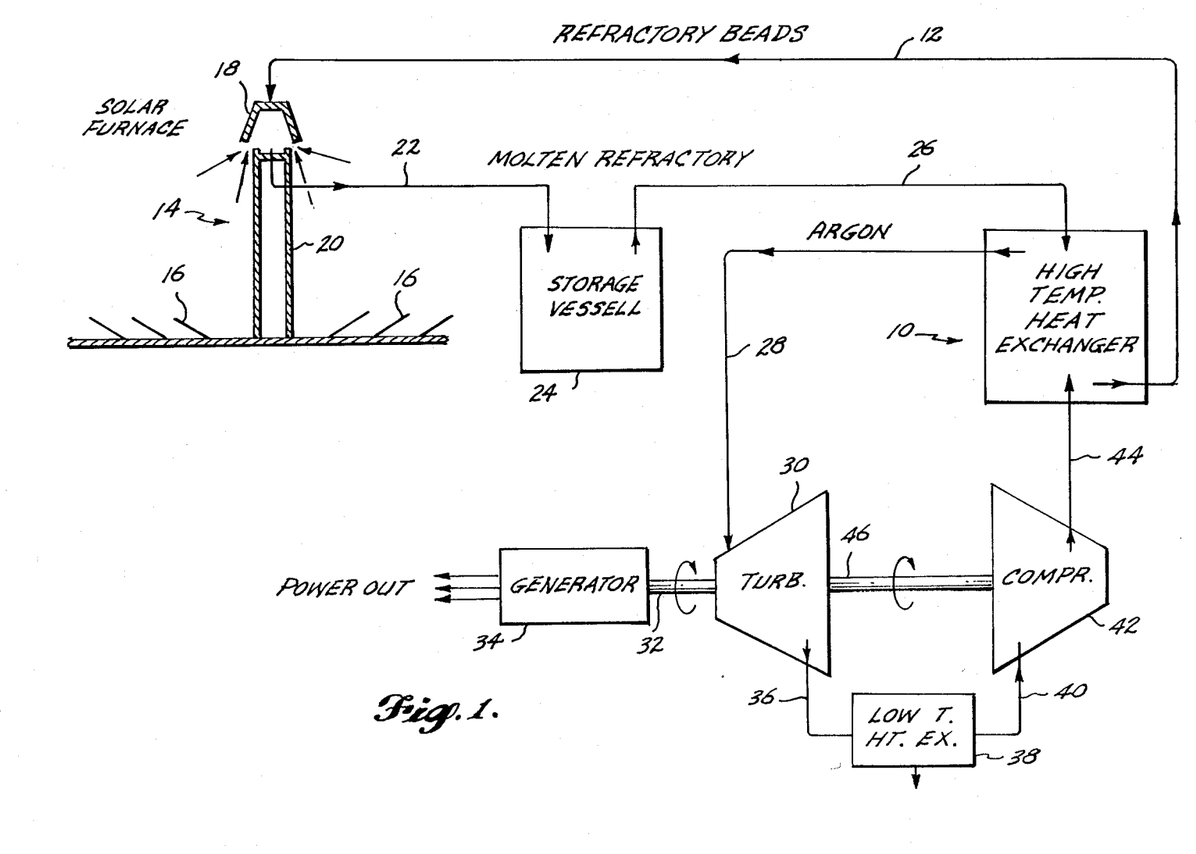
FIG. 1 is a schematic diagram of an energy conversion system employing the heat transfer and energy storage systems constructed in accordance with the present invention.

The Energy Conversion System:

Referring to FIG. 1, the droplet material is transferred from a heat exchanger 10 in the form of refractory beads along a transfer line 12 to a solar furnace generally designated 14. The solar furnace 14 is situated in the middle of a heliostat field 16. A radiation receiver 18 is situated at the top of a tower 20. The heliostat field directs and concentrates solar energy into the radiation receiver 18. As the refractory beads pass through the radiation receiver 18, the concentrated solar radiation heats the refractory beads to a temperature at which they become liquid. The liquid droplet material is then transferred by a liquid transfer line 22 to a suitable storage vessel 24. The storage vessel is insulated to minimize heat loss through the walls from radiation and conduction. The droplet material is withdrawn from the storage vessel preferably at a constant rate and transferred through transfer line 26 to the droplet heat exchanger 10, which will be described in more detail below.

The droplet material is introduced into the upper end of the heat exchanger as a stream or plurality of streams. Each stream breaks into a plurality of droplets of substantially uniform size that fall under the influence of gravity from the top toward the bottom of the heat exchanger. Simultaneously, a relatively inert, pressurized gas is injected into the bottom of the heat exchanger 10 and passes upwardly in countercurrent relationship to the falling droplet material. As the two materials pass in countercurrent flow relationship, heat is exchanged from the droplet material to the gas, heating the gas to a relatively high temperature. As the droplets fall through the heat exchanger, they give up their sensible heat as well as their latent heat of fusion, if any, and are converted from a liquid to solid refractory beads. The refractory beads are withdrawn through a suitable valving system and returned to the solar furnace 14 via the transfer line 12.

The gas is withdrawn adjacent the upper end of the heat exchanger and transferred via a conduit 26 to an expansion engine 30 such as a gas turbine. The high-temperature gas is expanded through the expansion engine where it is converted to mechanical energy. The mechanical energy is withdrawn in this embodiment via a rotating shaft 32, which drives an electrical generator 34 to produce electrical energy. The expanded gas leaves the turbine via outlet line 36. The gas is then channeled through a low-temperature heat exchanger 38 from which additional heat energy is extracted from the gas. The low-temperature gas leaves the low-temperature heat exchanger via line 40 and is compressed by a compressor 42 back to a pressure at which it can be injected into the droplet heat exchanger via line 44. The compressor 42 is preferably driven by a second rotary shaft output 44 from the expansion engine 30.

A unique feature of this energy conversion system is that thermal energy storage can be accomplished at or near the same high thermodynamic potential at which the solar radiation is absorbed in the solar collector, resulting in the capability to achieve higher efficiencies than heretofore were practical. The high efficiency at which the energy conversion and storage take place favorably reflects back through the cost of the entire solar energy conversion system. For example, more useful energy can be obtained from a smaller heliostat field. Additionally, the thermodynamic efficiencies of the heat exchangers are relatively high as the droplet material is always introduced into the heat exchanger at a constant high temperature, always maximizing the thermal driving force between the heat exchange media.

The Heat Exchange Media:

Silica is only one of the materials that can be employed within the purview of the present invention as the first heat exchange medium. The first heat exchange medium must have a melting point in the range desired for an operating and storage temperature. The medium must also be inert at high temperature with respect to the second heat exchange medium. The first medium most preferably has a low vapor pressure to avoid contamination of the second heat exchange medium. Refractory oxides generally meet the foregoing criteria. Refractory oxides such as alumina, lime, chromic oxide, magnesia, silica, soda, lithia, zirconia and mixtures thereof can be employed. Silica, however, has a number of attractive properties, including a relatively low melting point (on the order of 1713° C.), is abundant and therefore inexpensive, and is also environmentally benign.

Although silica is relatively viscous in its molten tate, the addition of metal oxides such as sodium oxide (soda), potassium oxide, lithium oxide (lithia), magnesium oxide (magnesia), calcium oxide, and lead oxide will reduce the viscosity of a silica melt by breaking the continuity of the silicate cross-linking and thus render the molten silica more susceptible to the desirable flow characteristics. For example, at 1725° K., the viscosity of pure silica is approximately $10^{10}$ poise. The addition of 35% by weight sodium oxide reduces this viscosity to 22 poise. Similarly, the addition of 25.0% by weight lithium oxide to pure silica reduces the viscosity even further to 4.8 poise. Although this additional reduction in viscosity produced by the addition of lithium oxide is potentially of great benefit, lithium oxide may raise problems with respect to chemical attack on a storage vessel lining. Therefore, silica doping with sodium oxide is a presently preferred material.

The refractory oxides discussed above are not exclusive of the possibilities available for capacitive storage materials. Under the constraints that the material should be available, cheap, and benign, there are numerous other candidates that can be employed. For example, glasses containing various mixtures of the alkaline oxides of sodium, lithium, and potassium, undergo crystalline phase changes at the high working temperatures. Thus, it is possible to take advantage of higher heat capacitive effects of these materials because of the large amounts of energy that can be stored in crystalline phase changes. Utilization of these materials could therefore reduce the storage volume otherwise required for pure refractory oxide.

The second heat exchange medium can comprise any suitable fluid that is immiscible with the first medium and from which heat can readily be extracted in a known energy conversion system. For the energy conversion system disclosed, the second medium preferably comprises a gas that is relatively inert when compared with the first medium. For example, any of the inert gases such as argon are satisfactory for extracting heat from a refractory oxide and then for expansion through a heat engine to produce mechanical work.

Figure 2:
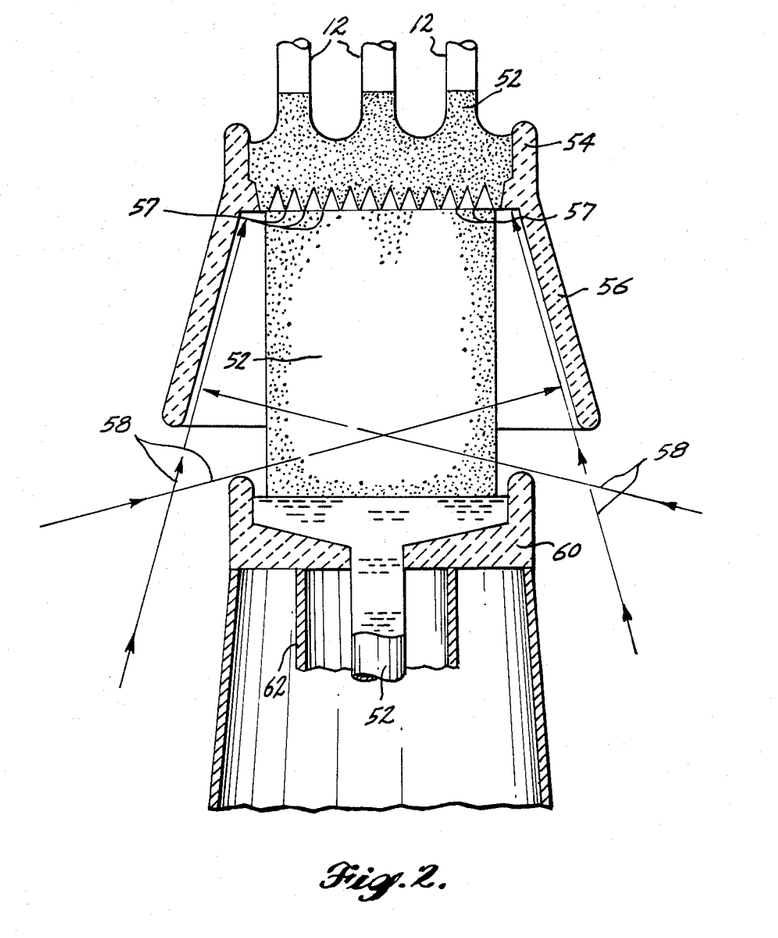
FIG. 2 is a schematic diagram of a solar furnace that can be employed to heat the first heat exchange medium.

The Solar Receiver:

Turning now to FIG. 2, the solar receiver is an important component of the solar powerplant and energy storage system disclosed above. The upper end of the solar furnace 14 is shown in schematic longitudinal section. Refractory beads 52 are delivered via lines 12, part of the refractory bead delivery system, to a circular trough 54 positioned above a frustoconically shaped, downwardly diverging reradiator cavity 56. The trough 54 has a plurality of openings 57 in its bottom through which the refractory beads 52 fall as a shower of particles through the reradiator cavity 56. Radiation from the heliostats is beamed upwardly into the reradiator cavity 56 as indicated by the arrows 58. As the refractory beads pass downwardly through the reradiator cavity, the beads absorb solar radiation and are heated to or above their fusion temperature. The molten beads, or droplet material, fall into a crucible 60 positioned below the rearadiator cavity. A ceramic conduit 62 surrounds a flow aperture 64 in the bottom of the crucible 60. The droplet material 52 issues from the aperture 64 and falls into a storage container, preferably located below the crucible at the bottom of the solar furnace tower. A suitably insulated ceramic pipe has a diameter on the order of three to four times that of the aperture 64 from the crucible 60. The droplet material flows as a free viscous jet from the aperture and does not contact the ceramic pipe as it travels downwardly from the crucible.

The reradiator cavity can be lined with oxidation-resistant carbon-composite blocks and insulated by alumina-silica fiber blankets. This structure is surrounded by a steel shell. The structure is similar in construction to that described below in conjunction with the storage vessel. Similarly, the ceramic pipe surrounding the outlet jet of droplet material is similarly designed and insulated. The crucible itself is constructed of the same materials as the interior lining of the energy storage vessel.

The flow of beads from the trough 54 is controlled to maintain the droplet material and refractory crucible at its proper maximum operating temperature. If loss of insolation occurs because of a sudden overcast or nightfall, the flow of beads from the trough into the rearadiator cavity is stopped. The remaining molten material in the crucible is then emptied into a storage vessel. Upon restarting the solar furnace, the receiver crucible is first partially filled with refractory beads. These beads are then melted by reradiation from the upper section of the cavity. Once this initial charge is melted, the injection of beads from the trough through the reradiator cavity is resumed, allowing normal operation to proceed.

The Energy Storage System:

A unique feature of the integrated energy conversion system of the present invention is the capability of storing energy at the same high thermodynamic potential at which it is collected in the solar furnace. By absorbing energy directly into the refractory material, energy storage can very easily be integrated with the power cycle. As briefly mentioned above, energy storage is accomplished in accordance with the present invention by placing the molten refractory material into a large storage vessel situated below the solar receiver. In this manner, a reserve of high-temperature molten refractory material is available at all times, thus allowing the energy conversion system to operate continuously at constant temperatures and outputs despite the fluctuation in insolation or other primary source.

It is preferred that the energy storage vessel be located at ground level directly beneath the reradiator cavity. The vessel is a relatively large, unpressurized container that is lined and insulated. The vessel can be sized to hold sufficient material to supply thermal energy to the powerplant for any period it is wished to accommodate. In the solar energy conversion system described, the minimum size vessel would be that required to hold a sufficient amount of molten refractory material to run the energy output device during the night hours. Preferably, of course, the system would store more material than this, as there may be times when the sun may be blocked for spans greater than a nocturnal period because of atmospheric conditions.

The storage container is constructed with due regard for the physical and chemical stability of the first heat exchange medium, for example, the molten refractory material. For the latter material, much information relevant to the design and construction of such containers is available from the highly developed technology of the glass industry. For example, the vessel walls can be constructed of a plurality of layers of heat-resistant and insulating materials. The interior hot face of the vessel which is in direct contact with the molten storage material can be composed of fused-cast alumina-zirconia or carbon blocks in a layer about 30 centimeters thick. The same material is utilized in sidewalls of glass-melting furnaces and is resistant both to the high temperature and chemical attack of molten storage materials such as silica. The alumina-zirconia blocks are very dense and are manufactured to close dimensional tolerances, effectively eliminating surface porosity in the joints that otherwise make common refractory material subject to corrosion by liquid glass or silica. Additionally, a lining constructed of assembled blocks is more easily repaired than a monolithic structure. Additionally, these construction materials are initially relatively inexpensive and are inexpensive to maintain.

Positioned radially outwardly from and adjoining the alumina-zirconia blocks is a 23-cm thick layer of lightweight insulating silica-alumina refractory with a temperature rating of about 1900° K. Sandwiched outside this layer is a 47-cm thick layer of similar material that has a temperature rating of about 1500° K. A steel shell is positioned outside these refractory insulating layers to contain the pressure head resulting from a full vessel of liquid refractory. The roof can be constructed entirely of a silica-alumina fiber refractory as it will not be wetted by molten material. For the nonwetted roof, a 50-cm layer of silica-alumina refractory will provide a resistance to heat flow equal to the wall construction just described. A vessel constructed as outlined above having a diameter of about 24 meters and a height of about 24 meters will suffer less than 0.85% of capacity heat loss in or over a period of 48 hours. Of course, a higher level of insulation in the storage vessel could prove to be more economical, depending on the cost of the additional insulation relative to the thermal energy lost. The vessel just described is suitable for storage of a molten refractory such as silica. Other refractory materials having higher fusion temperatures than silica will, of course, require different materials to directly contact the molten material as well as may require additional insulation because of the higher driving forces present.

Heat lost by conduction through the walls of the vessel will be easily dissipated by convection to the surrounding atmosphere. It is recommended that the tank not be located below ground level because the earth, while allowing a somewhat simpler supporting structure, has an insulation value that would allow heat to accumulate in the vessel lining until the temperature limits of the lining materials are exceeded. Thus, an underground storage vessel would require an active cooling system as opposed to the passive system suggested for an aboveground vessel.

Figure 3:
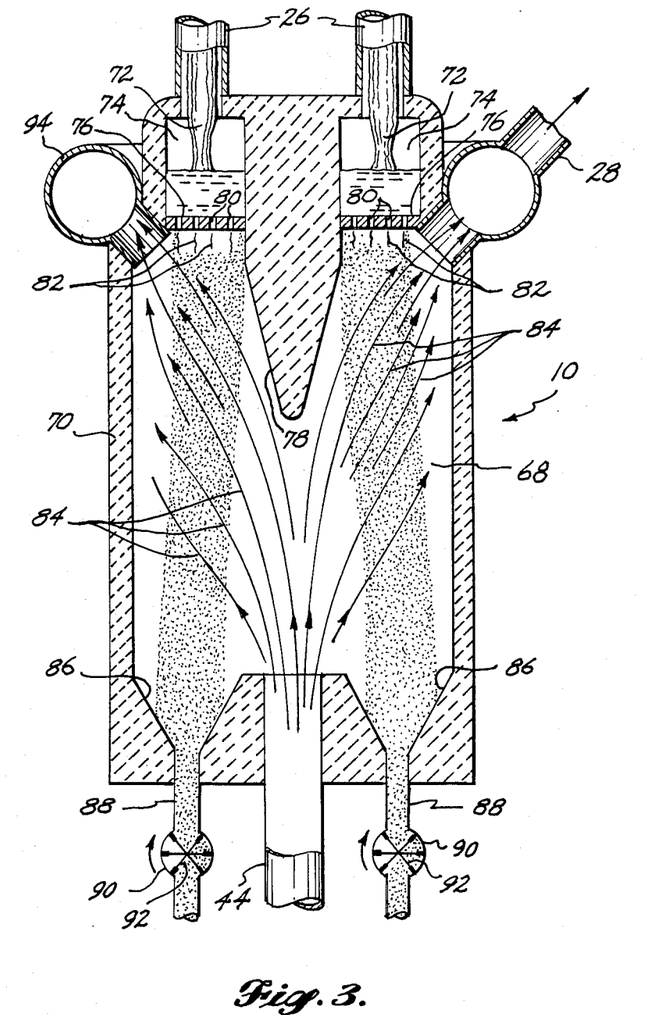
FIG. 3 is a schematic diagram of the high-temperature, direct-contact droplet heat exchanger constructed in accordance with the present invention.

The Direct-Contact Heat Exchanger:

The direct-contact heat exchanger is an important and integral part of the energy conversion system just described. It, however, by itself, constitutes a separate invention that is usable not only in the environment of the energy conversion system herein described, but in many other applications as well. Referring to FIG. 3, the direct-contact heat exchanger 10 comprises a single large pressure vessel 70 that houses a heat transfer chamber 68. The vessel 70 is insulated from the inside in a manner similar to that of the storage vessel. The use of carbon as a liner material is preferred because it is not wetted by the molten refractory material. Molten refractory 72 enters an annular channel 74 at the top of the vessel 70 through the line 26. An annular plate 76 forms the bottom of the annular channel 74 and surrounds a flow divider 78 that extends and diverges downwardly into the chamber 68. The plate 76 comprises a material that can withstand the heat of the molten refractory such as an alumina-zirconia or carbon material. The plate 76 carries a plurality of orifices 80 through which the molten refractory is issued at the top of the chamber 68 in a plurality of streams 82. The molten refractory is forced through the orifices 80 by a pressurized gas in the annular channel 74 to drive the refractory through the nozzles and out in the streams 82. Each of these streams 82 is relatively small in diameter and is externally excited so that it breaks up quickly into a series of uniform drops that fall together, in a shower through the heat exchanger, transferring their stored heat to a working gas or other suitable fluid.

External excitation of the refractory stream can be provided by subjecting the stream to a mechanical vibration. The frequency of the vibration necessary to break the liquid stream into uniform droplets can be determined. The break-up of the stream into droplets is described in terms of the deviation of a streamline from its original location. For the outer surface of the stream, the deviation $\lambda$ is given as a function of time, t, by $$\lambda = \lambda^* e^{\eta t} \tag{1}$$

where $\lambda^*$ is an initial disturbance and $\eta$ is the amplification factor which is a function of the wave parameter $\alpha$ given by the formula $$\alpha = 2\lambda a/l \qquad (2)$$

where a is the initial jet radius and l is the wavelength of the disturbance. According to Wickemeyer, R. H. et al., in their article entitled "Breakdown of a Liquid Filament Into Drops Under the Action of Accoustic Disturbances," Technical Note No. 1-167, Report No. AS-67-6, University of California Office of Research Services, Berkley, Calif. (1967), the analysis for a viscous stream with aerodynamic forces results in an $\eta(\alpha)$ being given as $$\eta^2 + \left(\frac{3\mu}{\rho a^2}\right)\alpha^2\eta = \frac{\sigma}{2\rho a^3}(1-\alpha^2)\alpha^2 + \frac{\rho_g}{2\rho a^2}U^2\alpha^3\frac{K_0(\alpha)}{K_1(\alpha)} \qquad (3)$$

where the density $\rho$, viscosity $\mu$, surface tension $\sigma$, are for the emerging jet. The velocity parameter $U_r$ is the relative velocity between the gas stream and the molten liquid jet. The density of the gas is $\rho_g$. $K_0$ and $K_1$ are the modified Hankel function of order zero and one, respectively. It has been demonstrated that the stream breaks up uniformly at coordinates where $$\frac{l\eta}{l\alpha} = 0. \qquad (4)$$

From continuity, we have $$\pi a^2 l = \frac{4}{3}\pi r_p^3 \qquad (5)$$

Thus, in Equations 2 through 5, $\alpha$, a, l and $\eta$ determine the geometry of the emerging stream for a given drop size $r_p$.

The stream breaks up when $\lambda = a$. The breakup time can be obtained from Equation 1 above at $\lambda = a$ as follows:

$$t_{bu} = \frac{1}{\eta}\ln\left(\frac{a}{\lambda^*}\right). \qquad (6)$$

Breakup distance $X_{bu}$ is related to the breakup time and the jet velocity U. Most importantly, however, the rate of drop generation that is the frequency of external excitation is given by $$f = \frac{U}{l} \qquad (7)$$

After the stream breaks up into drops, the droplets fall through the working gas at terminal velocity, cooling convectively.

The working gas is schematically indicated by the upwardly pointed arrows 84. As the droplet shower falls through the upwardly moving gas stream 84, a sufficient amount of heat is extracted from the droplets to solidify them into beads. The beads are collected in an annular trough 86 at the bottom of the vessel 70. The troughs 86 are funnelled into two or more conduits 88 that are connected to the bead transfer path 12 by depressurizing valve mechanisms 90. The valve mechanisms 90 comprise a plurality of diametrically oriented vanes running on a shaft axially situated in a cylindrical valve housing. The valve rotor 92 is rotated so that refractory beads are transferred from the conduit 88 to the transfer path 12 while diametrically opposed blade tips always maintain sealing contact with the periphery of the cylindrical valve housing. In this manner, the interior of the vessel 70 is always maintained in a pressurized state.

As described above, the compressor 42 compresses the gaseous second heat exchange medium, in this preferred embodiment argon, to a high pressure. The pressurized gas is then transmitted through the line 44 into the bottom of the vessel 70 where it is directed upwardly through the heat transfer chamber 68 and into direct and intimate contact with the falling droplets. As the gas is heated, it is accelerated upwardly and is collected in the hot gas plenum 94 on the top of the vessel 70. The plenum 94 leads into the hot gas outlet conduit 28, from whence the pressurized heated gas is channeled to the expansion engine.

Heat Transfer Analysis:

For purposes of analyzing the heat transfer capabilities of the direct-contact heat exchanger constructed in accordance with the present invention, a point design analysis was undertaken for a system that is capable of producing 100 MW of electricity. For the purpose of this analysis, the heat exchanger has been modeled by a simple one-dimensional flow problem. It is assumed that the refractory droplets are uniformly distributed across the flow area and are of uniform diameter (d). The droplets are all injected at the same speed, that is near their terminal velocity in the gas at the conditions existing at the top of the tower. It is assumed that the droplet velocity has no radial components. The chamber 68 is a cylindrical volume with perfectly insulated sides. The gas enters at the bottom and leaves at the top of the chamber with a velocity profile that is uniform across the flow area. For this analysis, argon has been chosen as the working gas and it is assumed that the gas velocity at the top is 80% of the droplet terminal velocity in the gas.

Since the density, velocity and viscosity of the gas change as a function of height in the tower, the droplets do not retain their initial injection velocity with respect to the gas. The equation of motion of a spherical particle falling through a gas is $$\frac{DU_p}{Dt} = g - \frac{3}{4}\frac{C_D U_r |U_r|\rho_g}{\rho_p d} \qquad (1)$$

where d and $\rho_p$ are the particle diameter and density, respectively, $U_p$ is the velocity of the particle (or droplet), $U_r$ is the relative velocity between particle and gas, g is the acceleration of gravity, $C_D$ is the drag coefficient, and $\rho_g$ is the gas density. The buoyancy, "added mass" and "history" terms are negligible and have not been included. The drag coefficient ($C_D$) is a function of Reynolds number, $R_e = \rho_g U_r d/\mu_g$, where $\mu_g$ is the gas viscosity. For this analysis the single particle correlation for $C_D$ for $R_e \leq 1000$, given by the following formula, is used:

$$C_D = \frac{24}{R_e} + \frac{4}{R_e^{\frac{1}{3}}} \qquad (2)$$

The Reynolds number in formula (2) is based on the local relative velocity between particles and gas. For $1000 < R_e < 10^5$, we have assumed $C_D = 0.42$. These correlations for $C_D$ are applicable when the volume fraction of particles is small.

Because the heat exchanger cross-sectional area is assumed constant, the continuity equation for the gas in steady flow is $$\rho_g U_g = \text{const} \quad (3)$$

where $U_g$ is the gas velocity relative to the heat exchanger.

The continuity equation for a steady flow of droplets is $$\beta_v \rho_p U_p = \text{const} \quad (4)$$

where $\beta_v$ is the volume fraction of the droplets.

The momentum equations for the droplets and the gas can be combined to obtain an overall momentum equation for the mixture, such that the particle-gas interaction term drops out, i.e., $$\rho_g \frac{DU_g}{Dt} + \beta_v \rho_p \frac{DU_p}{Dt} = -\frac{\partial p}{\partial x} - (\rho_g + \beta \rho_p)g \quad (5)$$

where p is the gas pressure and x is distance along the heat exchanger. It should be kept in mind that $U_p$ and $U_g$ have opposite signs since the gas flows countercurrent to the droplets.

The heat transfer between the droplets and the gas is governed by the Nusselt number, $Nu = hd/k_g$, where h is the film coefficient of heat transfer, d is the droplet diameter and $k_g$ is the thermal conductivity of the gas. It has been demonstrated that the Nusselt number between a gas and a cloud of particles depends on the volumetric concentration of the particles as well as the particle Reynolds number in accordance with the following correlation:

$$N_u = 0.00114 \beta_v^{-0.5984} R_e^{0.8159} \quad (6)$$

This relationship is applicable in the range of $0.00025 < \beta_v < 0.05$ and $180 < R_e < 1800$, which falls within the regime of operation of the droplet heat exchanger.

Although the thermal conductivities of the refractory oxides of interest as a working material are relatively small, they are nevertheless much higher than the thermal conductivity of the gas. The Biot number for refractory droplets can be shown to be $<0.1$, and thus it can be assumed that the interiors of the droplets are at a uniform temperature.

Accordingly, the equations governing the temperatures of the falling droplets and the counterflowing gas are respectively:

$$\frac{DT_p}{Dt} = -\frac{6N_u k_g}{cd^2 \rho_p}(T_p - T_g) - \frac{6\epsilon\sigma}{c\rho_p d}(T_p^4 - T_w^4) \quad (7)$$

$$\frac{DT_g}{Dt} = \frac{6N_u k_g}{c_{pg} d^2 \rho_p}\left(\frac{\dot{m}_p}{\dot{m}_g}\right)(T_p - T_g) \quad (8)$$

where $T_p$ is the droplet temperature, $T_g$ is the gas temperature, $T_w$ is the wall temperature, $\dot{m}_p$ and $\dot{m}_g$ are the mass flow rates of the droplets and gas, respectively, and $k_g$ and $c_{pg}$ are the thermal conductivity and specific heat at constant pressure of the gas, respectively. The specific heat of the droplet material is c and the blackbody emissivity is $\epsilon$. $\sigma$ is the Stefan-Boltzmann constant. Implicit in the above equations is that the volume fraction, $\beta_v$, occupied by the droplets is very small, i.e., $\beta_v < 0.01$, a valid assumption.

In Equation 7 the two terms on the right-hand side represent respectively the convective and radiative transfer from the particle. Only the convective term is effective in transferring heat to the gas since the preferred gases, argon and nitrogen, are transparent to blackbody radiation in the temperature range of interest. Furthermore, the volume fraction of droplets is small enough that the cloud of droplets is optically thin and there is no significant trapping of the radiation by the droplets. The radiative transfer is thus from the droplets to the walls. However, the assumption of an insulated wall will render the wall temperature approximately equal to the droplet temperature under steady state conditions and thus radiative losses will be very small. No radiative term is included for Equation 8 since the emissivities of the preferred gases are very small at the temperatures of interest.

Data for the viscosity $\mu_g$, and thermal conductivity of the gas ($K_g$), as functions of temperature, were obtained from standard reference sources and subjected to a fourth order least squares procedure to obtain analytical expressions for use in the analysis. The heat capacity of argon is constant at 0.124 cal/g°K. over the temperature range of interest. The thermal conductivity and heat capacity of soda glass refractory droplets are 0.02 W/cm°K. and 0.36 cal/gm°K., respectively, and are also constant.

Numerical calculations for the steady flow case were then made of the velocities, temperatures, heat transfer rate and gas properties stepwise through the heat exchanger for heating argon at 20 atm by molten glass beads (65% by weight $SiO_2$, 35% by weight $Na_2O$) injected into the heat exchanger at 1725° K. Gas inlet and exit temperatures of 675° K. and 1500° K. were respectively chosen to illustrate an example. The gas exit temperature is not limited by any essential part of the equipment. Higher temperatures could be achieved by choosing a particle material with a suitable melting point and designing a suitable refractory wall. Temperatures of 2000° K. should be attainable with current refractory practice. Similarly, the working gas could be any mixture that has properties to match the power generation cycle.

For purposes of the present analysis, a Brayton cycle with an inlet temperature of 1500° K. at 20 atm was chosen. The turbine expands the argon to 2.63 atm and 667° K. Heat is rejected at constant pressure into the conventional heat exchanger, cooling the argon to 300° K. (This low-temperature heat exchanger could also be a direct-contact type, similar to the high-temperature droplet heat exchanger described above, but using a different droplet medium such as a low melting point metal eutectic or a silicone oil. The flow of heat in this case would be from the gas to the droplets.) After leaving the conventional heat exchanger, the gas is then recompressed to 20 atm and 675° K. prior to reentering the high-temperature heat exchanger. The cycle efficiency is 56% under these conditions. Assuming no electric generation losses, a pilot plant of 100 MW output would require 180 MW of thermal power to be delivered to the turbine inlet and would require an argon mass flow of $1.5 \times 10^6$ kg/hr and a mass flow of beads of $5.1 \times 10^5$ kg/hr.

The height of the heat exchanger is strongly dependent on the particle size, that is, the smaller the particles, the lower the height of the heat exchanger. However, smaller particles require more injector orifices to maintain the necessary mass flow of glass. Beads of 2 mm diameter provide a reasonable compromise. To produce droplets of this size an injector nozzle diameter of 0.75 mm is required. The required mass flow of droplets is achieved through the use of 60,000 such nozzles spaced on a 2.1 cm grid. The injected streams of glass breakup in 0.4 m, which is a small portion of the heat exchanger height. The droplet generation frequency per stream is about 238 Hz. The vertical droplet spacing under these conditions is approximately 1 cm.

Figure 4:
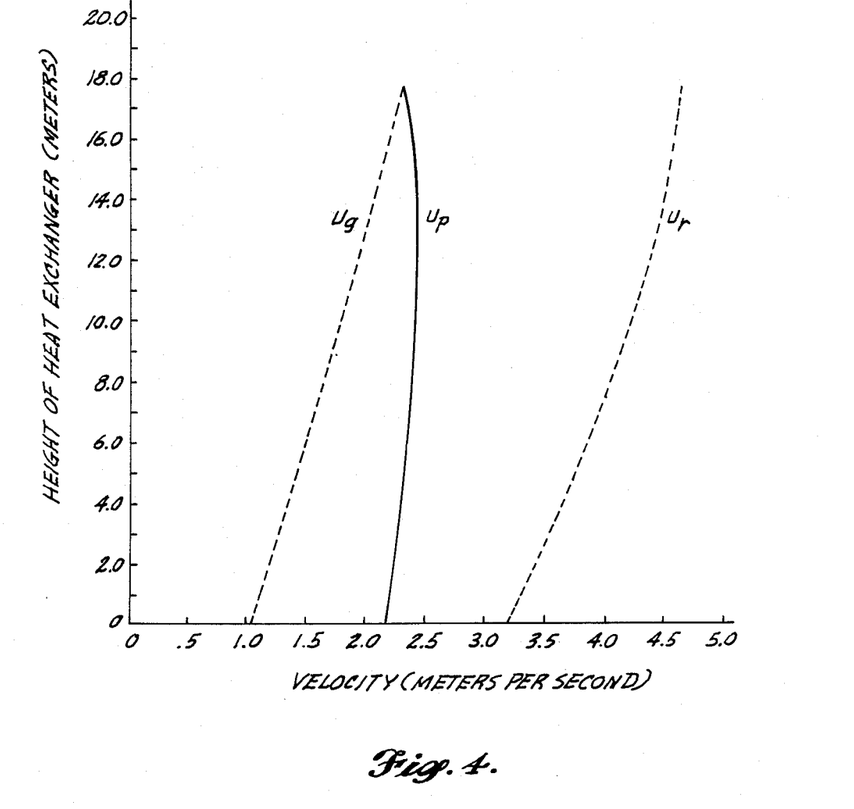
FIG. 4 is a graph of height versus velocity of droplets ($U_p$) and gas ($U_g$) as well as relative velocity ($U_r$) of the two in the droplet heat exchanger.
Figure 5:
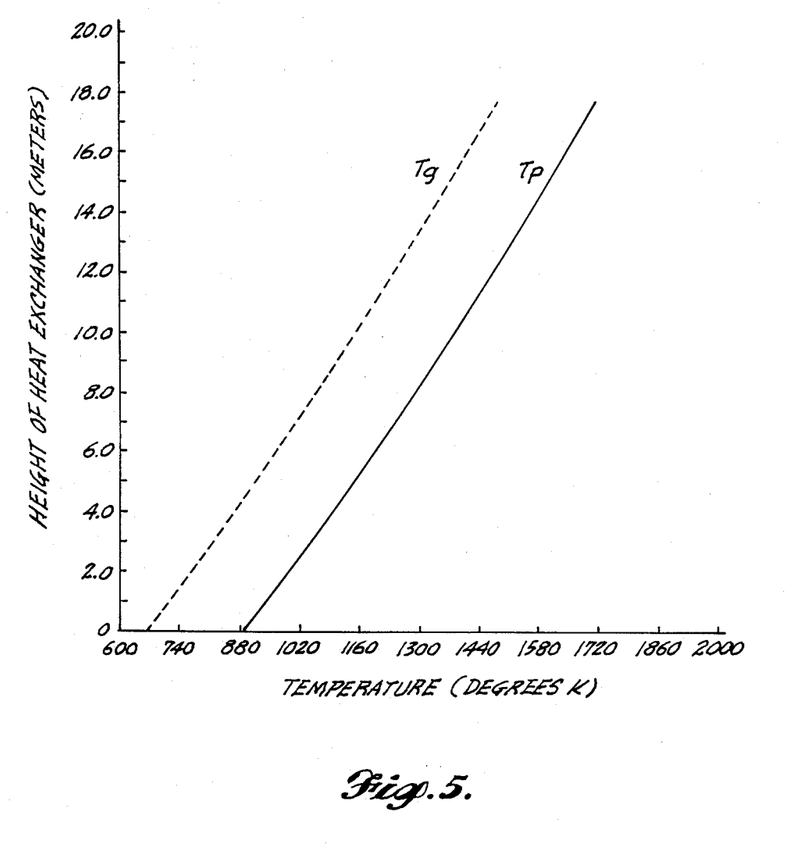
FIG. 5 is a graph of the height versus temperature of droplets ($T_p$) and gas ($T_g$) in the droplet heat exchanger.

Transfer of the required 180 MW is accomplished in a tower 17.7 m high×5.9 m diameter. The beads fall through this height in 7.6 seconds. The velocity profiles of the beads and gas in the heat exchanger are shown in FIG. 4. Gas velocity is so low throughout the heat exchanger that its momentum and kinetic energy can be neglected. Furthermore, the particle loading is very low so that the total static pressure head of gas and particles is negligible. Furthermore, the total pressure drop of the gas between the bottom and the top of the heat exchanger is less than one percent of the inlet pressure. The relative velocity between beads and gas is close to but somewhat lower than the local terminal velocity at any point. The temperature profiles of the gas and the beads are shown in FIG. 5. Although the droplets solidify during their transit, the release of heat of fusion is small due to the amorphous nature of the glass bead material and thus has not been included in the present analysis. Any suitable temperature difference ($\Delta T$) between the particles and gas at the top of the heat exchanger may be chosen, while the mass flow rates of the two media can be selected to tailor the temperature profiles. In the present case, a 225° K. difference was chosen and the thermal mass flow rates matched to result in a constant temperature difference at all heights in the heat exchanger.

End effects, the turbulence resulting from the presence of the cloud of beads and the interaction of the flow with the walls, will cause deviations from the simple one-dimensional flow regime assumed for the foregoing calculations. Collisions between beads in the area of the heat exchanger where they are still molten will result in some degree of agglomeration of the individual particles which will affect both the heat transfer rate and the velocity relative to the gas.

Other effects that have received preliminary attention are injection and transport losses, vaporization of the refractory and working gas losses. Briefly, the parasitic losses due to injection and transport of the molten refractory in the system presented here are estimated to be only approximately 0.29% of the plant's net electrical output. The vaporization of the refractory in the heat exchanger has been calculated to be of the order of $10^{-3}$ kg/hr. When compared to the argon mass flow rate of $1.5 \times 10^6$ kg/hr, it is evident that the contamination of the working gas is negligible. Similarly, the loss of working gas resulting from removal of the solid bead aggregate at the bottom of the heat exchanger is estimated to be only approximately 0.05% of the mass flow of the gas.

General Discussion:

The advantages and applications of the heat transfer and energy conversion system are numerous. The direct-contact heat exchanger of the present invention requires materials that only experience small mechanical stresses. Additionally, the heat exchange medium is remanufactured during each cycle of the system. Thus, the heat exchange system employed in accordance with the present invention is not exposed to the problems of thermal shock characteristic of prior art ceramic heat exchangers. In addition, because the heat exchange medium directly contacts a working gas, the extremely expensive and prior art materials required for conventional tube and fin heat exchangers can be eliminated. In addition, the working life of the heat exchanger of the present invention far exceeds that of any other known heat exchanger at these temperatures.

The droplet heat exchanger of the present invention is also relatively free of other problems associated with conventional heat exchangers, such as fouling, reliability, and low effectiveness because of relatively low thermodynamic driving forces or temperature differentials that can be employed. In the droplet heat exchanger of the present invention, fouling is mitigated since any material adhering to the droplets can be skimmed off in the molten phase. The heat exchanger of the present invention also exhibits good heat exchanger effectiveness by presenting a large surface surface area for heat transfer by means of the surfaces of a dense cloud of small liquid droplets. A droplet heat exchanger effectiveness of 0.90 to 0.95 is feasible. Another advantage of the droplet heat exchanger is the negligible pressure drop incurred by the second heat transfer medium. Finally, the reliability of the heat exchanger of the present invention is excellent because there are no tubes to rupture, no downtime because of tube surface fouling. Corrosion can also be largely avoided by selecting compatible heat exchange media and inert conduit materials. Additionally, the heat exchanger of the present invention is easily integratable into a heat storage system since the molten heat transfer medium can be utilized to store heat over intermediate periods of time. Especially when used in conjunction with intermittent energy sources, such as solar energy, the heat storage capability can be a significant advantage.

In addition of the use of the droplet heat exchanger of the present invention in a solar energy conversion system, it can be employed to extract heat from a dirty gas, and thereafter to transmit the extracted heat to a clean gas that can in turn be employed to run a turbine. For example, coal-fired steam plants presently operate at peak steam temperatures of approximately 820 to 920° K. The peak steam temperatures are limited both by gas-to-steam heat exchanger systems and by the metallurgical limits of steam turbine blades. The droplet heat exchanger of the present invention can, for example, be employed in the coal combustion chamber to extract heat directly from the flue gas at temperatures much closer to the stoichiometric flame temperature of coal, that is, approximately 1650° K. The droplets can then be cycled to heat a clean gas stream to drive a gas turbine topping cycle, allowing thermal cycle efficiencies for a combined cycle to exceed 50% as compared to 40% for conventional steam cycles. Thus, the droplet heat exchanger offers the potential for direct, relatively cheap coal combustion for high-efficiency power production.

Possible additional applications for the droplet heat exchanger of the present invention include high-temperature coal-fired electric powerplants with compressed air storage and thermal energy storage, air-blown, coal gasification plants, hydrogen heaters, solar thermal powerplants, low-temperature applications such as geothermal power applications, and thermal powerplant dry cooling towers. In these other applications the heat transfer media employed in the direct-contact heat exchanger are certainly not limited to a refractory oxide and an inert gas. For example, liquid metals, in pure, alloy or eutectic form can be employed as the first heat exchange media in lower temperature applications. These media can be employed with relatively inert gaseous second media such as steam, even with liquids such as hot water. The basic criteria of the two media set forth in connection with the refractory oxides above must still however be carefully observed. An especially important criterion is that the media must be immiscible as well as substantially insoluble in each other, that is, having a mutually insolubility of on the order of less than 0.001%.

A coal-fired electric power plant can use the droplet heat exchanger as a means of storing high-temperature heat at the same time that compressed air is stored in an underground cavern. The coal combustion system transfers heat during off-peak hours to one of the turbine stages to drive the air compressor and charge the caverns. Part of the heat transfer medium from the droplet heat exchanger is also deposited in the thermal storage unit. When air is withdrawn from the compressed air storage it is reheated by the stored thermal storage unit. When air is withdrawn from the compressed air storage is reheated by the stored thermal energy in order to drive the peaking power turbine. Without stored thermal energy, a clean fuel such as natural gas or No. 2 fuel oil must be burned for the peaking turbine. The droplet heat exchanger, therefore, has the potential for storing heat at sufficiently high temperatures (i.e., 1500° K.) to displace scarce clean fuels in this peaking power application. Instead, coal can be burned directly with conventional low-temperature stack gas cleanup. Furthermore, since the coal can be burned over a much longer period (i.e., off-peak hours) the coal combustor and stack gas cleanup system can be made quite small compared to conventional compressed air storage peaking gas turbine plants.

The advantage of using a droplet heat exchanger in a coal gasification plant stems from the ability to transfer heat from a separate air-blown coal combustor to the coal undergoing gasification without injecting any of the combustion products into the gasification feedstock streams. Two ways to accomplish this heat transfer application are breifly described. In the first case, the heated transfer medium is used in a second droplet heat exchanger to superheat steam (or $CO_2$) for the coal gasification reactions. In the second case, the heated transfer medium is used to both heat the feedstock (steam or $CO_2$) and to maintain temperatures in the reaction vessel. To summarize, each approach maintains a much higher hydrogen and hydrocarbon concentration in the syngas product stream by eliminating the nitrogen and combustion products (i.e., $CO_2$) normally accompanying air- or oxygen-blown gasification.

Droplet heat exchangers also provide a unique technique for heating hydrogen to high temperatures. Hydrogen interacts with metallic heat exchangers to embrittle them at high temperatures. In the chemical process industries where hydrogenation reactions are carried out, the droplet heat exchanger permits isolated or integrated (i.e., with the chemical reactor) heating of hydrogen to temperatures that heretofore could be reached only by side reactions (i.e., combustion) that tended to contaminate the product output.

The solar thermal powerplant generally described can capitalize on both the high temperature heat transfer capabilities of the droplet heat exchanger and the thermal storage features of the heat transfer medium. By storing the heat in a molten glass, storage costs may be reduced by an order of magnitude over the nearest competitor (e.g., molten salts). The increase in efficiency of the accompanying power cycle associated with the peak temperature capabilities of the droplet heat exchanger also helps to reduce the size and cost of all upstream components (i.e., heliostat field, solar reciver, and thermal storage unit).

The present invention has been described in conjunction with a preferred embodiment of the direct-contact heat exchanger and energy storage system as well as the overall energy conversion system. Further details and advantages may be derived by reading the related articles by Shaw, David J. et al., "A New Method of Efficient Heat Transfer and Storage at Very High Temperatures," 15th Intersociety Energy Conversion Engineering Conference, Seattle, Wash., Aug. 18-22, 1980; and Bruckner, Adam P. et al., "A New Method for High Temperature Solar Thermal Energy Conversion and Storage", Solar Thermal Test Facilities Users' Association Annual Meeting, Pasedena, Calif., Apr. 21-24, 1981, both of which are expressly incorporated herein by reference. One of ordinary skill, after reading the foregoing specification, however, will be able to effect various changes, substitutions of equivalents, and other alterations to the disclosed embodiments without departing from the broad concepts embodied herein. It is therefore intended that the scope of the protection granted by Letters Patent hereon be limited only by the definition contained in the appended claims and equivalents thereof.

The embodiments of the invention in which an exclusive property or privilege is claimed are defined as follows:

1. A method for exchanging heat between a first liquid heat exchange medium and a second gaseous heat exchange medium that is immiscible with and substantially insoluble in said first medium comprising:
   causing the first heat exchange medium to traverse a heat transfer zone in the form of droplets, said first heat exchange medium being injected into said heat transfer zone as a plurality of relatively small diameter liquid streams, the liquid streams being sized and the first heat exchange medium being selected to cause each of the streams to break into a plurality of droplets of substantially uniform size as they enter the heat transfer zone, said liquid streams further being externally mechanically excited to produce said droplets of substantially uniform size, and
   causing the second heat exchange medium to traverse the heat transfer zone in countercurrent flow relationship to said first heat exchange medium and allowing the heat exchange medium to make intimate thermal contact with each other.

2. The method of claim 1 further comprising:
   allowing said first heat exchange medium to be cooled to a solid in said heat transfer zone.

3. The method of claims 1 or 2 wherein said second heat exchange medium is gaseous.

4. The method of claim 3 wherein said first and second heat exchange media are substantially inert relative to each other.

5. The method of claim 3 wherein said first heat exchange medium is a refractory oxide.

6. The method of claim 5 wherein said first heat exchange medium is selected from the group consisting of alumina, lime, chromic oxide, magnesia, silica, soda, lithia, zirconia, and mixtures thereof.

7. The method of claim 1 wherein said first heat exchange medium is injected into said heat transfer zone in a plurality of liquid streams sized to cause said first heat exchange medium in each of said streams to break into a plurality of droplets of substantially uniform size.

* * * * *

UNITED STATES PATENT AND TRADEMARK OFFICE
CERTIFICATE OF CORRECTION

PATENT NO.  : 4,727,930

DATED       : March 1, 1988

INVENTOR(S) : Adam P. Bruckner et al.

It is certified that error appears in the above-identified patent and that said Letters Patent is hereby corrected as shown below:

Column 1, line 44: "sytems" should be --systems--
Column 2, line 55: "th" should be --the--
Column 5, line 9: "44" should be --46--
Column 5, line 44: "tate" should be --state--
Column 5, line 60: "doping" should be --doped--
Column 9, line 4: "$\lambda$" should be --$\pi$--
Column 9, line 18: "$U^2$" should be --$U_r^2$--

Column 9, line 29, 30: "$\frac{\partial \eta}{\partial \alpha} = 0$" should be -- $\frac{\partial \eta}{\partial \alpha} = 0$ --

Column 9, line 50: Insert --f,-- after "generation"
Column 9, line 51: Insert --,-- (comma) after "excitation"

Note that the equations located at Columns 10 and 11 should be renumbered as follows:

Column 10: "(1)" should be --(8)--
   Column 10: "(2)" should be --(9)--
   Column 11: "(3)" should be --(10)--
   Column 11: "(4)" should be --(11)--
   Column 11: "(5)" should be --(12)--
   Column 11: "(6)" should be --(13)--
   Column 11: "(7)" should be --(14)--
   Column 11: "(8)" should be --(15)--

Column 10, line 64: "(2)" should be --(9)--
Column 11, line 25: Insert --the-- before "distance"
Column 12, line 6: "7" should be --14--
Column 12, line 20: "8" should be --15--
Column 12, line 24: "(Kg)," should be --kg,--

UNITED STATES PATENT AND TRADEMARK OFFICE
CERTIFICATE OF CORRECTION

PATENT NO. : 4,727,930

DATED : March 1, 1988

INVENTOR(S) : Adam P. Bruckner et al.

It is certified that error appears in the above-identified patent and that said Letters Patent is hereby corrected as shown below:

Column 12, line 37: "SiO$_2$,35%" should be --SiO$_2$, 35%--
Column 13, line 10: "0.75mm" should be --0.74mm--
Column 13, line 58: "0.29%" should be --0.2%--
Column 14, line 27: Delete "surface" (1st occurrence)
Column 14, line 45: "of" should be --to--
Column 14, line 68: "powerplants" should be --power plants--
Column 15, line 3: "powerplants" should be --power plants--
Column 15, line 5: "powerplant" should be --power plant--
Column 15, line 31: Insert --it-- before "is"
Column 15, line 51: "breifly" should be --briefly--
Column 16, line 4: "powerplant" should be --power plant--
Column 16, line 15: "reciver" should be --receiver--
Column 16, line 62: "medium" should be --media--

Signed and Sealed this

Tenth Day of January, 1989

Attest:

DONALD J. QUIGG

Attesting Officer

Commissioner of Patents and Trademarks